UNITED STATES PATENT OFFICE.

JAMES F. BULKLEY, OF BROOKLYN, NEW YORK.

IMPROVED ARTIFICIAL FUEL.

Specification forming part of Letters Patent No. 53,779, dated April 10, 1866; antedated March 30, 1866.

*To all whom it may concern:*

Be it known that I, JAMES F. BULKLEY, of the city of Brooklyn, Kings county, and State of New York, have invented a new and useful Improvement in Artificial Fuel; and I do hereby declare the following to be a clear and exact description thereof.

The nature of my invention consists in producing an article of fuel that has a decided advantage over anthracite and other mineral and waste coal-dust, that frequently fails to ignite or burn freely when manufactured into fuel, and gives off very disagreeable odors in burning. I therefore use finely-prepared pulverized charcoal well saturated with whisky and the essential oils of whisky, to make the charcoal ignite and burn freely and give out an agreeable odor. I then mix the same with a paste of flour and water until the whole is of a proper consistency to cut and be formed into convenient and useful blocks of any shape or size as an artificial fuel for common uses. The blocks or balls are to be dried in the sun or by heat, as most convenient, and never fail to ignite or burn as an aromatic artificial fuel.

What I claim as my invention, and desire to secure by Letters Patent, is—

Prepared charcoal saturated with whisky, volatile oils, and a glutinous paste formed into blocks, as a cheap aromatic artificial fuel for common uses.

JAMES F. BULKLEY.

Witnesses:
H. J. WILSON,
EDM. F. BROWN.